(12) United States Patent
Sweeney et al.

(10) Patent No.: US 6,446,426 B1
(45) Date of Patent: Sep. 10, 2002

(54) MINIATURE PULSED HEAT SOURCE

(75) Inventors: William R. Sweeney, Richmond; A. Clifton Lilly, Jr., Chesterfield, both of VA (US)

(73) Assignee: Philip Morris Incorporated, New York, NY (US)

( * ) Notice: Subject to any disclaimer, the term of this patent is extended or adjusted under 35 U.S.C. 154(b) by 0 days.

(21) Appl. No.: 09/564,646

(22) Filed: May 3, 2000

(51) Int. Cl.[7] .......................... A61L 9/03; F23D 14/18; A24F 47/00
(52) U.S. Cl. ...................... 60/39.81; 60/723; 60/39.822; 431/1; 431/7; 431/18; 431/254; 431/255; 431/256; 131/330; 131/194; 310/40 MM
(58) Field of Search .......................... 431/67, 86, 87, 431/255, 256, 257, 268, 328, 2, 1, 12, 7; 131/330, 194; 60/723, 821, 822, 39.81, 39.76, 39.822, 39.78; 310/40 MM; 126/229, 231; 239/99

(56) References Cited

U.S. PATENT DOCUMENTS

| | | | | |
|---|---|---|---|---|
| 816,154 A | * | 3/1906 | D'Arsi | |
| 2,243,924 A | * | 6/1941 | Schmitt et al. | |
| 2,286,231 A | * | 6/1942 | Schmitt | |
| 2,482,794 A | * | 9/1949 | Peterson | |
| 2,493,266 A | * | 1/1950 | Schmitt | |
| 3,242,700 A | | 3/1966 | Fukal | |
| 3,561,903 A | * | 2/1971 | Rubinstein et al. | ......... 431/350 |
| 3,740,183 A | * | 6/1973 | Piffith et al. | |
| 3,759,244 A | * | 9/1973 | Konet | |
| 3,778,924 A | * | 12/1973 | Okui | |
| 3,850,359 A | * | 11/1974 | Obergfell | |
| 4,047,876 A | * | 9/1977 | Rice | |
| 4,207,055 A | * | 6/1980 | Tanaka | |
| 4,233,998 A | | 11/1980 | Radey, Jr. | |
| 4,247,283 A | | 1/1981 | Vidas | |
| 4,405,072 A | * | 9/1983 | Kindle et al. | |
| 4,694,841 A | | 9/1987 | Esparza | |
| 4,774,970 A | | 10/1988 | Bell | |
| 4,854,331 A | | 8/1989 | Banerjee et al. | |

(List continued on next page.)

FOREIGN PATENT DOCUMENTS

| | | | | |
|---|---|---|---|---|
| EP | 858744 A1 | | 8/1998 | |
| FR | 368592 | * | 12/1906 | ..................... 431/1 |
| JP | 57-204712 | * | 12/1982 | ................. 431/268 |
| JP | 60-185021 | * | 9/1985 | ................. 431/268 |
| JP | 402017311 | * | 1/1990 | ................... 431/33 |
| JP | 3-70913 | * | 3/1991 | |

OTHER PUBLICATIONS

Notification of Transmittal of the International Search Report or the Declaration for PCT/US01/1172, International Filing Date: May 3, 2001.

Primary Examiner—Carl D. Price
(74) Attorney, Agent, or Firm—Burns, Doane, Swecker & Mathis, LLP (57) ABSTRACT

A miniature heat source capable of being used in a hand-held device for delivering a metered pulse of fuel to a combustion chamber where it is converted into a pulsed amount of heat. For example, the heat source apparatus can be used in a hand-held cigarette smoking system or within a portable device wherein a microturbine generates electricity, as well as any type of environment where a high energy pulse of heat is desired. The heat source includes a valve such as a sliding, rotatable or timed valve which delivers a metered volume of fuel to the combustion chamber. The valve can deliver the fuel, in an expanded gaseous form, to a venturi conduit which increases the velocity of the gas flow, and delivers the fuel to a combustion chamber where the gas is mixed with air. The combustible mixture is then combusted within the combustion chamber by ignition and/or by catalyzed oxidation. The heat source provides a consistent, controlled and pulsed amount of heat with a higher energy capacity as compared to battery powered heat sources.

31 Claims, 6 Drawing Sheets

U.S. PATENT DOCUMENTS

| | | | |
|---|---|---|---|
| 4,856,981 A | | 8/1989 | Flanagan |
| 4,891,003 A | | 1/1990 | Ishiguro |
| 4,993,435 A | | 2/1991 | McCann |
| 5,000,676 A | * | 3/1991 | Fiala |
| 5,127,822 A | | 7/1992 | Nakayama et al. |
| 5,161,964 A | * | 11/1992 | Frigiere et al. |
| 5,179,966 A | | 1/1993 | Losee et al. |
| 5,213,247 A | * | 5/1993 | Gschwend et al. |
| 5,274,214 A | | 12/1993 | Blackburn |
| 5,282,740 A | * | 2/1994 | Okayasu |
| 5,479,948 A | | 1/1996 | Counts et al. |
| 5,529,078 A | | 6/1996 | Rehder et al. |
| 5,928,605 A | * | 7/1999 | Bonnema et al. |
| 5,932,940 A | | 8/1999 | Epstein et al. |
| 6,138,664 A | * | 10/2000 | Hanada et al. |
| 6,193,501 B1 | * | 2/2001 | Masel et al. |

* cited by examiner

MINIATURE PULSED HEAT SOURCE

FIELD OF THE INVENTION

The present invention relates to a heat source for delivering a pulse of heat by combustion of a metered amount of liquid fuel. More particularly, the invention relates to a miniature heat source for use in portable devices where a controlled pulse of heat is desired.

BACKGROUND OF THE INVENTION

Fuel igniting devices are disclosed in U.S. Pat. Nos. 4,247,283; 4,856,981; 4,891,003; and 5,127,822. Of these, the '283 patent relates to a flaming trumpet which emits a flame under the control of the musician playing the instrument, the '981 patent relates to a pulse combustion burner connected to a tailpipe or exhaust pipe, the '003 patent relates to a pulse combustion device connected to a tailpipe, and the '822 patent relates to a combustion apparatus for various heating applications.

U.S. Pat. Nos. 3,242,700 and 5,274,214 relate to cigarette lighters. The '700 patent discloses a lighter which includes a sparking wheel and an ignitable fuel. The '214 patent discloses a battery powered lighter which includes a resistance heating element.

U.S. Pat. Nos. 4,694,841; 4,774,970; 4,854,331; and 5,179,966 disclose various tobacco smoking devices. The '841 patent is a system for self lighting cigarettes using substances which react with each other, the '970 patent discloses a device which includes a conventional gas lighter, the '331 patent discloses a smoking article wherein a carbonaceous fuel element is used to heat a tobacco flavor medium, and the '966 patent discloses a smoking article which utilizes an electrically heated element to heat a tobacco flavor medium. Another type of smoking device is disclosed in European Patent Publication No. 858744 wherein heat from a combusted gas heats a heat exchanger which raises the temperature of a tobacco containing substance to generate flavor without burning the substance.

A limitation of battery powered heat sources is that it is necessary to recharge the battery or replace it with a non-rechargeable battery after a certain period of use. A disadvantage of liquid fuel heat sources is that the fuel can be wasted since it is not metered. Accordingly, it would be desirable if a heat source were available which obviates the need to recharge or replace the battery of a battery powered heat source. It would also be desirable if such a heat source could produce a consistent pulse of heat corresponding to the specific heat needs of the application in order to prevent the waste of fuel.

SUMMARY OF THE INVENTION

The invention provides a miniature heat source for delivering a metered pulse of fuel which can be converted into heat, as disclosed by the various preferred embodiments of the invention. The miniature heat source of the present invention is ideally suited to be implemented in an environment where a high energy pulse of heat is desired. For example, it is contemplated that the heat source could be used within a portable, hand-held device for smoking tobacco or used as part of an electricity generating microturbine.

In one embodiment, the invention provides a miniature heat source for providing a pulsed amount of heat, the heat source comprising a housing which includes a combustion chamber, a valve member and a liquid fuel source. The fuel is preferably mixed with air and supplied to the combustion chamber as a combustible gas which passes through a venturi arrangement and the combustible mixture can be ignited and/or catalytically reacted to produce heat. When the heat source is used in a smoking device, the heat from the combusted fuel can be transferred to a heat transfer member which heats tobacco sufficiently to allow smoking thereof.

BRIEF DESCRIPTION OF THE DRAWINGS

The invention will now be described in more detail with reference to preferred embodiments of the invention, given only by way of example, and with reference to the accompanying drawings, in which.

DESCRIPTION OF THE PREFERRED EMBODIMENTS

The invention provides a miniature heat source which can be implemented in any type of environment where a high energy pulse of heat is desired. In portable electrical heat source systems, power consumption is a significant concern since the system not only needs to provide adequate power to produce an amount of heat, but must also provide power to operate electrical components of the system for a desired time period, e.g., a day or a week, or longer. Moreover, it is desirable to provide a lightweight and/or hand-held heat source which can be implemented in various miniature devices which utilize high energy pulses of heat during operation. The invention achieves such goals by providing a miniature pulsed heat source which can minimize electrical components and/or the need for a battery. Furthermore, because the miniature heat source is operated to produce a pulse of heat from a liquid fuel, the heat source can include ancillary electrical components which do not consume large amounts of electrical power.

The miniature heat source comprises a housing which includes a liquid fuel source, a combustion chamber and a valve member. The valve member can be a sliding, rotatable or timed valve member. For instance, the valve can be movable between first and second positions and provided with a metering chamber for holding a metered quantity of fuel to provide a pulsed amount of heat. In the first position, the valve member prevents fluid communication between the liquid fuel source and the combustion chamber. In the second position, the valve member permits the metered amount of fuel to be delivered to the combustion chamber. The combustion chamber generates a pulsed amount of heat by combusting the fuel supplied to the combustion chamber when the valve member is in the second position.

The fuel is preferably mixed with air in a venturi to provide a combustible mixture. The combustible mixture can be combusted by an igniter such as a spark generator which ignites the mixture and/or a catalytic member which causes the mixture to undergo a catalytic combustion reaction. For example, the combustible mixture can be ignited in a rich condition and the resulting inefficient flame can be used to heat a catalytic element which heats to a light-off temperature and causes the combustible mixture to undergo a heat producing catalytic reaction. When the heat source is used in a smoking device, for example, the resulting pulse of heat can be made to directly or indirectly burn the tobacco, thereby providing smoke that can be inhaled by the smoker. Alternatively, combustion of the mixture can be performed solely by a catalytic reaction such as by a catalytic element electrically preheated to initiate the catalyzed combustion process.

The pulse of heat generated by the heat source can be applied to an object such as tobacco either directly or through a heat transfer member. For example, rather than burning the tobacco directly with the gaseous combustion by-products, the tobacco can be heated by a heat transfer member which transfers heat from the gaseous combustion by-products.

According to one embodiment of the invention, the miniature heat source can reduce or eliminate the need for electrical storage devices, such as batteries. Moreover, compared to battery powered heat sources which may lose power and/or deliver inconsistent amounts of electrical energy, the heat source of the present invention can consistently deliver a controlled, concentrated pulse of heat with a higher energy capacity than electrically powered heat sources. Additionally, the liquid fuel heat source can provide a more consistent and precise amount of pulsed heat as compared to electrical power packs. The use of a catalytic member can also minimize production of carbon monoxide (CO) and hydrocarbons (HC) during combustion of the mixture.

Figure 1:
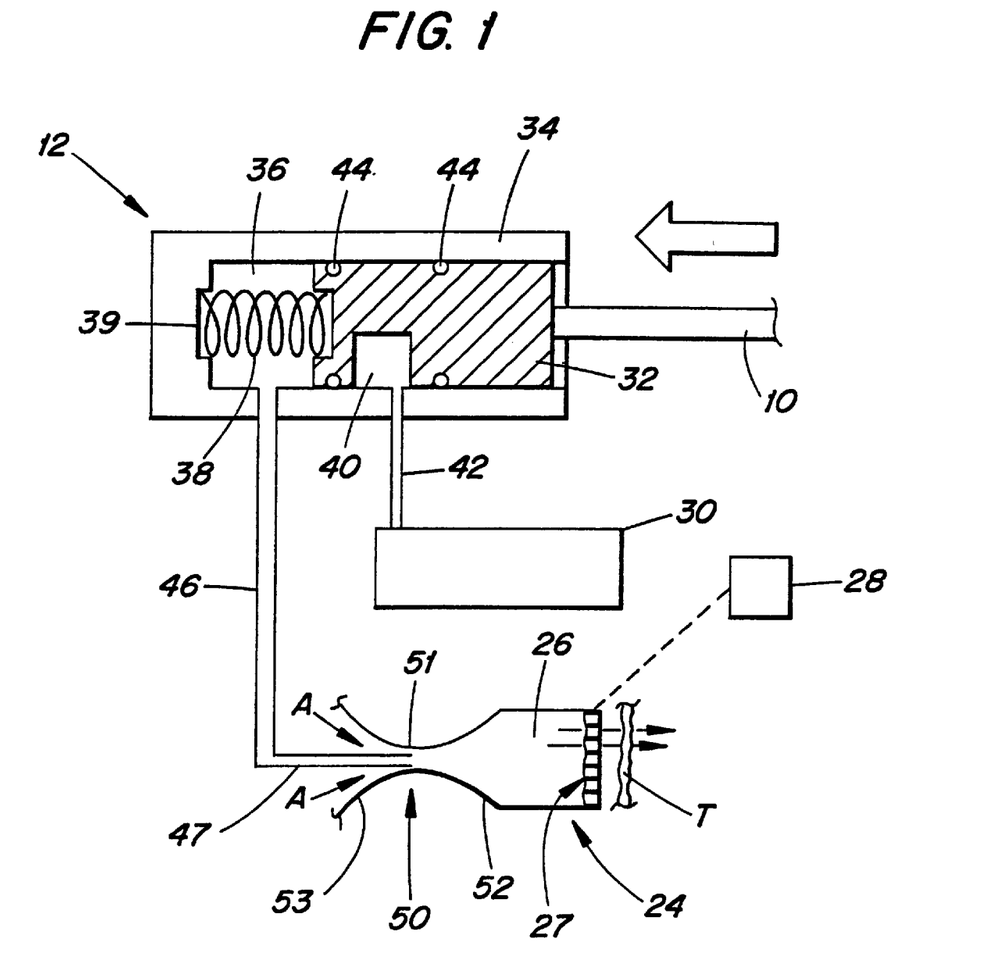
FIG. 1 is a schematic diagram of one embodiment of the heat source of the present invention.

FIG. 1 schematically shows an embodiment of the heat source 12 wherein the elements of the heat source 12 are preferably formed within a housing unit capable of being located in an environment where a high energy pulse of heat is desired. In this embodiment, the heat source 12 includes three interconnected subparts including a liquid fuel reservoir 30, a sliding valve 32 and a heat applying end 24. According to preferred embodiments of the heat source 12, the reservoir 30 and the sliding valve 32 can be used with different arrangements of the heat applying end 24. The heat applying end 24 combusts a delivered metered amount of gaseous fuel and generates a concentrated pulse of heat for application to an object, such as tobacco T.

Additionally, FIG. 1 shows an externally actuated trigger section 10 which is directly connected to the sliding valve 32 of the heat source section 12. The sliding valve 32 operates to provide a pulsed, metered amount of gaseous fuel to the heat applying end 24 of the heat source 12. At the heat applying end 24 of the heat source 12, the pulsed amount of gaseous fuel is converted into a pulse of heat which in turn either directly or indirectly heats an object, such as tobacco T, to a temperature suitable for smoking the tobacco such as between 700° and 1000° F. Alternatively, the tobacco may be heated without significant combustion to a temperature between 450° C. to 550° C. For example, the gaseous fuel can be mixed with air and combusted by a catalytic reaction using a catalytic member 27 which is resistively heated to a light-off temperature by an electrical power source 28.

More specifically, FIG. 1 shows the heat source 12 including a valve housing 34 for the sliding valve 32 which reciprocates within a valve housing chamber 36. The sliding valve 32 is movable within the chamber 36 between first and second positions and one end of the valve 32 is connected to the trigger section 10. The trigger 10 extends out of the valve housing 34 so as to be activated by the operator. A biasing member 38 such as a spring is provided between the other end of the sliding valve 32 and a wall 39 of the valve housing 34. The spring 38 exerts a biasing force in an opposite direction to the movement of the sliding valve 32 as it is actuated by the trigger 10. Accordingly, the sliding valve 32 is initially positioned in a first non-actuated position, as shown in FIG. 1, and is subsequently moved to a second actuated position upon actuation of the trigger 10. Spring 38 operates to automatically return the sliding valve 32 back to the first position upon the operator's release of the trigger 10. Although the foregoing embodiment includes a mechanically actuated sliding valve and biasing spring, it is contemplated that the valve could be moved by an electrical force or mechanism or other suitable arrangement. Also, while a metered sliding valve has been described, other valve arrangements could be used in place thereof, e.g., a rotatable valve, a timed valve, a push valve, etc.

The sliding valve 32 defines a metering chamber 40 having a fixed volume for holding a predetermined amount of fuel. Thus, the metering chamber 40 can provide a metering function to ensure that a desired amount of heat is consistently produced as will be discussed below. In the first position shown in FIG. 1, the metering chamber 40 is in fluid communication with the liquid fuel reservoir 30 via a supply conduit 42. The pressurized liquid fuel flows through the fuel inlet in the valve housing and into the metering chamber 40. When the operator depresses the trigger 10, the sliding valve 32 moves to the second position at which the metering chamber 40 is no longer in fluid communication with the fuel reservoir 30, e.g., an impermeable section of the sliding valve 32 defined by O-rings 44 shuts off the supply of liquid fuel from the supply conduit 42. If the operator depresses the trigger for an extended length of time, the sliding valve 32 remains in the second position and prevents the supply conduit 42 from delivering any additional fuel to the chamber 40. As a result, only the metered amount or pulse of fuel in the metering chamber 40 is supplied to the heat applying end 24 through a discharge conduit 46. This ensures that when the metering chamber 40 containing the liquid fuel comes into communication with discharge conduit 46, the metered pulse of fuel expands into a gaseous phase. Thus, the heat source 12 can ensure that the sliding valve 32 delivers only the pulsed, predetermined amount of fuel regardless of the duration of actuation of the trigger 10.

The metered amount of fuel supplied by the valve 32 can be mixed with ambient air or any other oxidizing gas to form a combustible mixture in the following manner. The pressurized, metered pulse of gaseous fuel within discharge conduit 46 flows downstream into a reduced diameter conduit 47 which opens into a venturi eductor 50 where the pressurized fuel (e.g., at approximately 2 atm) jets out of the conduit 47. The venturi eductor 50 is located at an entrance to a combustion chamber 26 in which the combustible mixture is combusted. In the embodiment shown, the fuel emerges from the venturi conduit 47 as a gaseous fuel at a throat 51 of the venturi eductor 50. Throat 51 has a diameter greater than the outer diameter of venturi conduit 47 so that atmospheric air can flow through the opening between the conduit 47 and the throat 51. The throat 51 widens downstream into an expanded cone section 52 which forms the combustion chamber 26. Air or other combustible gas is drawn into cone section 52 due to suction created by the expanding gaseous fuel and/or combustion thereof in the combustion chamber. A converging cone section 53 of the venturi which communicates with throat section 51 compresses the air as it flows in the direction of arrows A. The combustible mixture can be ignited or subjected to a catalytic reaction in the combustion chamber by a suitable igniter and/or catalytic element. For example, the combustible mixture can be passed into contact with the catalytic element 27 which has been preheated to a light-off temperature (e.g., preheated to approximately 200° C. by an electrical resistance heating element or by the ignited fuel) and the catalytic element causes the combustible mixture to undergo a catalytic reaction which generates a pulse of heat for directly or indirectly heating an object, such as tobacco T.

By supplying a small amount of fuel in the form of a pulsed delivery, sliding valve 32 can provide a dependable supply of fuel over an extended period of time thereby avoiding the need to frequently refuel or replace the liquid fuel reservoir 30. Further, the metering chamber 40 ensures that a consistent and precise amount of fuel per pulse is delivered in order to generate a predetermined amount of heat for application to an object to be heated, such as tobacco. The size of the metering chamber 40 can be varied at the time of manufacturing the sliding valve 32 depending on the desired amount of heat required to be applied to the object and the energy producing capacity of the liquid fuel being used. Thus, the amount of heat to be delivered by the heat source can be set by simply changing the size of the metering chamber 40. Further, with the metering chamber arrangement of the present invention, it is possible to avoid fuel waste when the trigger is depressed and held depressed for an extended period of time since only a single pulse of fuel is allowed to be delivered to the combustion chamber for each actuation of the trigger. Due to the precise metering of fuel delivery to the combustion chamber, the amount of generated heat can be limited to a desired level and thus, when used in a smoking device, generation of undesired odors and flavors can be avoided which could otherwise result from the delivery of too much heat and/or the production of too much combustion.

According to a preferred embodiment, the liquid fuel reservoir 30 can be designed to hold enough liquid fuel to allow the continued use of the miniature heat source for a extended period of time. Of course, the period of use of the heat source will vary depending upon the frequency of actuation of the trigger 10. When the liquid fuel reservoir 30 is emptied, the heat source can then be discarded or the depleted liquid fuel reservoir 30 can be refilled or replaced. The capacity of the liquid fuel reservoir 30 can be designed to deliver on the order of 1000 to 3000 heating pulses. Suitable types of fuel for the heat source include liquid petroleum gas such as butane, propane, or pentane, or a mixture thereof.

In the above described arrangement, butane or other liquid petroleum gas can be mixed with oxygen and ignited or catalyzed in a venturi type combustion chamber. The combustion of the mixture can be achieved in a variety of ways, as explained below.

Figure 2:
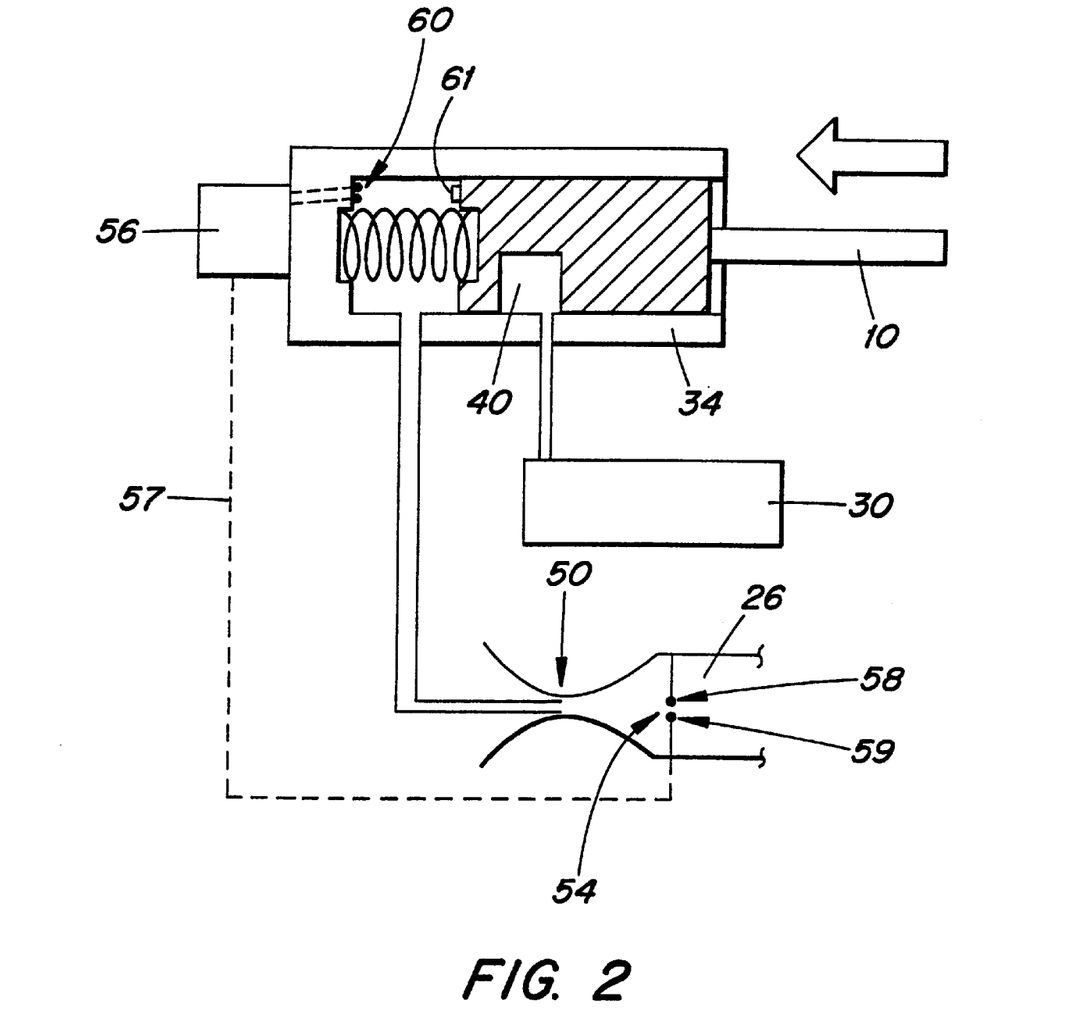
FIG. 2 is a schematic diagram of another embodiment of the heat source of the present invention.

FIG. 2 shows an embodiment wherein the combustible mixture in the combustion chamber 26 is combusted by a spark-type ignitor 54 which can be activated by a spark gap generator 56 such as a battery and associated circuitry for emitting a pulse of current. The spark gap generator 56 sends a pulse of current along wire 57 and the current creates a spark which "jumps" a gap defined between a pair of spaced apart terminals 58, 59 forming the ignitor 54 in the combustion chamber 26. The combustible mixture is thus combusted by the spark. If desired, the arrangement shown in FIG. 2 can be combined with the arrangement shown in FIG. 1 such that the flame heats the catalyst element 27 to the light-off temperature. In such an arrangement, non-combusted fuel and the combustion byproducts undergo a catalytic reaction as they are contacted with or passed through the catalyst element 27, thereby producing additional heat due to the reaction.

The catalyst member 27 preferably includes a porous surface containing one or more catalytic elements such as platinum, palladium, rhodium and iridium. For example, the catalytic member can comprise a Pt coating on a high surface area ceramic material such as alumina, zirconia, SiC, $Si_3N_4$, $SiO_2$, fused quartz, etc. If the catalytic member or the catalyzed fuel contacts the object to be heated, such as tobacco, it is preferred that the catalytic member be free of elements such as cu, Ni and/or Cr. In order for the catalytic member to heat rapidly, it is desirable for the catalytic member to be of a low thermal mass so that heat sink losses to the catalytic member can be minimized.

In the embodiment shown in FIG. 1, the catalyst member 27 comprises an air permeable material such as a screen, metallic foam, etched metal, etc., coated with an oxidation catalyst, such as platinum, palladium, rhodium, iridium, or mixture thereof. The heated catalyst screen promotes catalytic combustion of any incompletely combusted gases within the combustion chamber 26, such as carbon monoxide (CO) or hydrocarbons (HC). The resulting concentrated pulse of heat including a superheated air/$CO_2$ mixture emerges through the air permeable catalytic member and is directed to the object to be heated.

Figure 3:
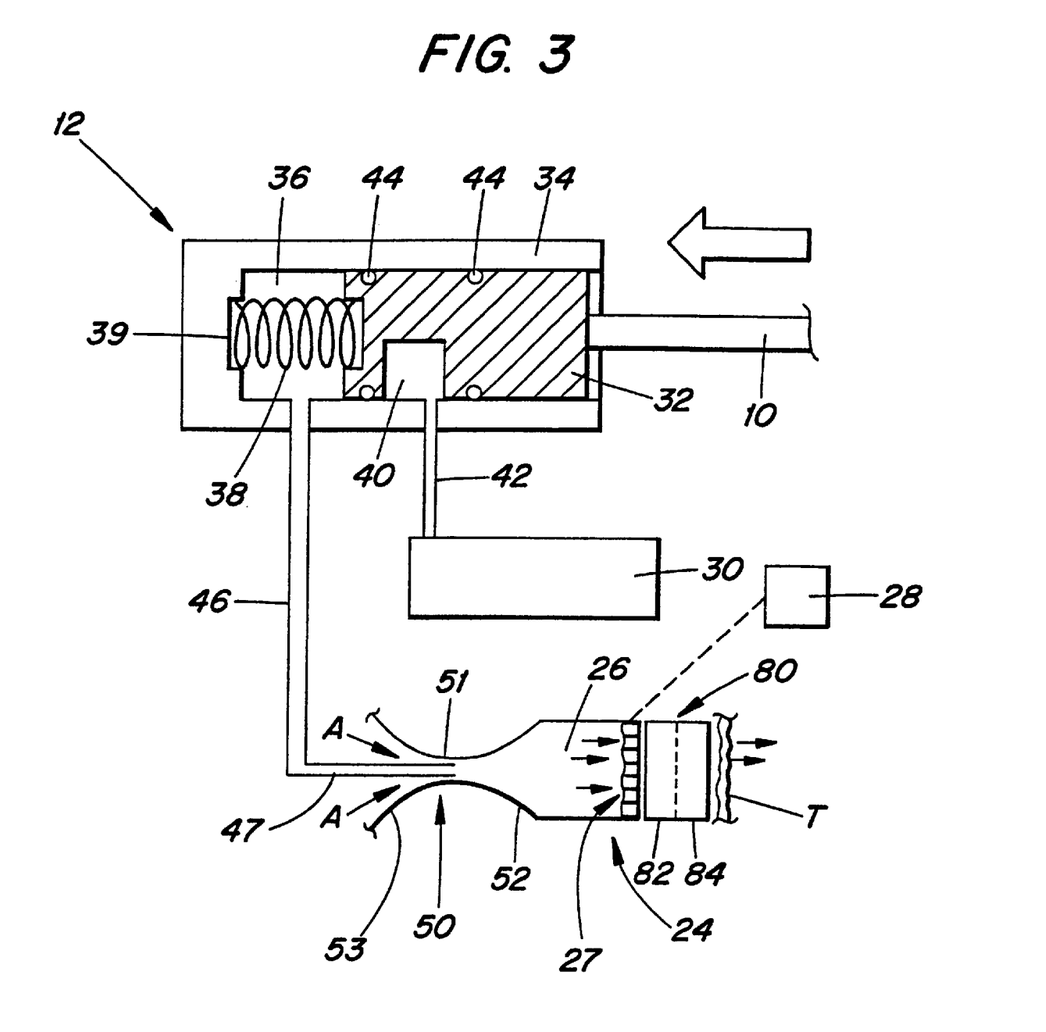
FIG. 3 is a schematic diagram of an embodiment of the heat source of the present invention with a variant of the heat applying end.

Alternatively, as shown in the embodiment of FIG. 3, the pulse of heat generated by the heat source can be applied to an object such as tobacco T indirectly through a heat transfer member 80. For example, rather than heating the object directly with the combusted gases, the object can be heated by way of a heat transfer member 80 which conducts heat from the combusted gases to the object. As a result, in addition to functioning as a heat transfer mechanism, the heat transfer member 80 prevents the passage of generated combustion by-products from contacting the object to be heated by isolating a combustion by products gaseous stream from an airstream heated by the pulsed amount of heat. Thus, the tobacco smoke generated by the heat transfer member does not contain the combustion by-products.

In a further embodiment, the heat transfer member 80 can be in the form of a laminate. As shown in FIG. 3, the heat transfer member 80 includes a first layer 82 and a second substrate layer 84. The heat transfer member 80 is arranged such that substrate layer 84 touches or is in close thermal proximity to the object T to be heated.

The first layer 82 of the heat transfer member 80 faces the combusted mixture generated in the combustion chamber 26. The first layer 82 is preferably made from a catalytic material which does not experience thermally induced degradation from repeated heatings. For example, the catalytic material can be made from one or more of platinum, palladium, rhodium and iridium. The catalytic material in the first layer 82 acts to generate additional heat energy by further catalytically combusting the mixture and more efficiently directing heat through the substrate layer 84 of the heat transfer member to the object to be heated.

The substrate layer 84 of the heat transfer member 80 can be made from a ceramic, preferably alumina. Alternatively, a metal or alloy can also be employed as the substrate layer 84. The substrate materials have the favorable characteristics of being strong, chemically unreactive and capable of withstanding high temperatures. The substrate layer acts as a heat transfer medium to direct the concentrated pulse of heat to the object to be heated.

Figure 4:
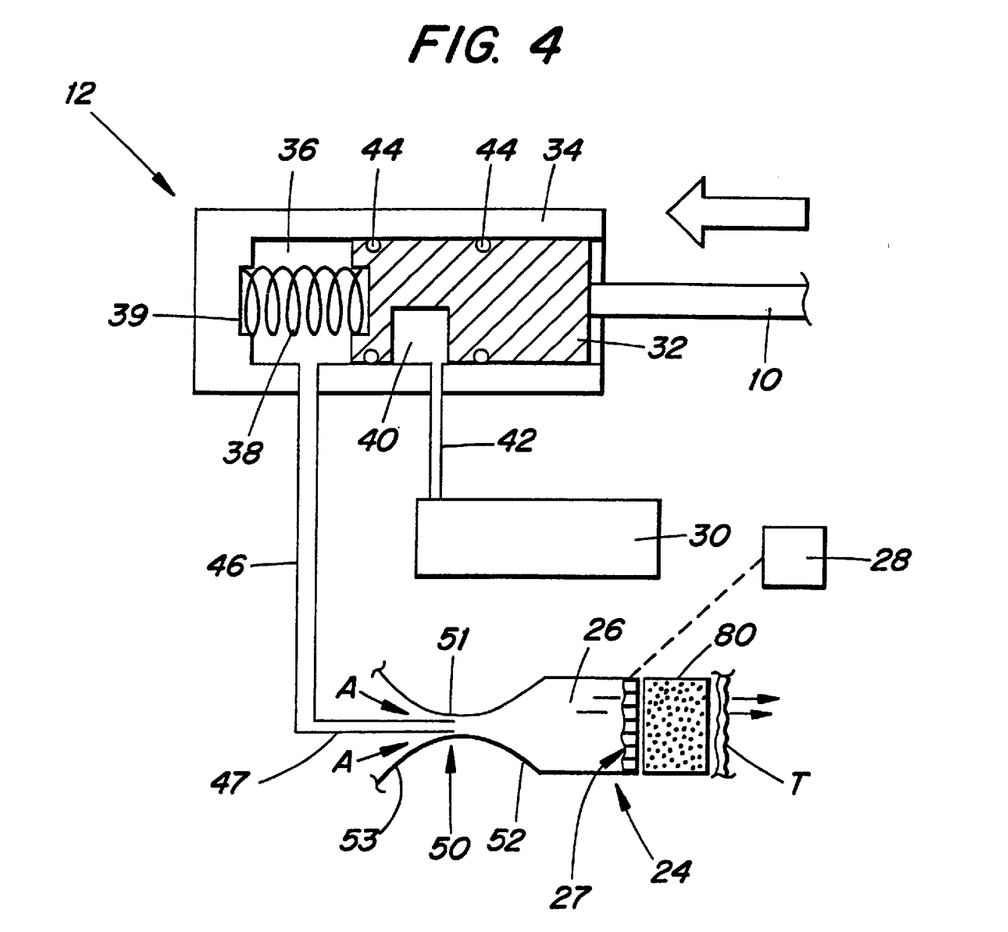
FIG. 4 is a schematic diagram of an embodiment of the heat source of the present invention with another variant of the heat applying end.

As shown in the embodiment of FIG. 4, the heat transfer member 80 can include a porous substrate with at least one of platinum, palladium, rhodium and iridium particles contained throughout the substrate. In this variant, the substrate acts to disperse the catalytic particles, thereby maximizing the surface area over which the catalytic particles are located. As in the previously discussed embodiments, the catalytic particles act to further catalytically combust the mixture and to more effectively direct heat through the heat transfer member 80 to the object to be heated.

The igniter 54 can be any device capable of igniting the fuel such as a mechanical spark generator, an electrical spark generator, resistance heated ignition wire or the like. The electrical spark generator can be powered by any suitable power source, such as a small battery. In the embodiment shown in FIG. 2, the igniter 54 is powered by an electrical device such as a battery 56 which supplies electric current when contacts 60 are closed by contact 61. However, the battery can be replaced with a piezoelectric transducer which generates an electric current when the trigger 10 activates the sliding valve 32. With such an arrangement, current can be generated electro-mechanically due to compression of the transducer. For instance, a striker can be arranged so as to strike the transducer with a predetermined force when the trigger is depressed. The electricity generated by the transducer can be supplied to a spark generating mechanism by suitable circuitry. Such an arrangement could be used to ignite the combustible mixture or heat the catalytic screen to a temperature high enough to effect the desired catalytic combustion reaction without igniting the combustible mixture.

Figure 6:
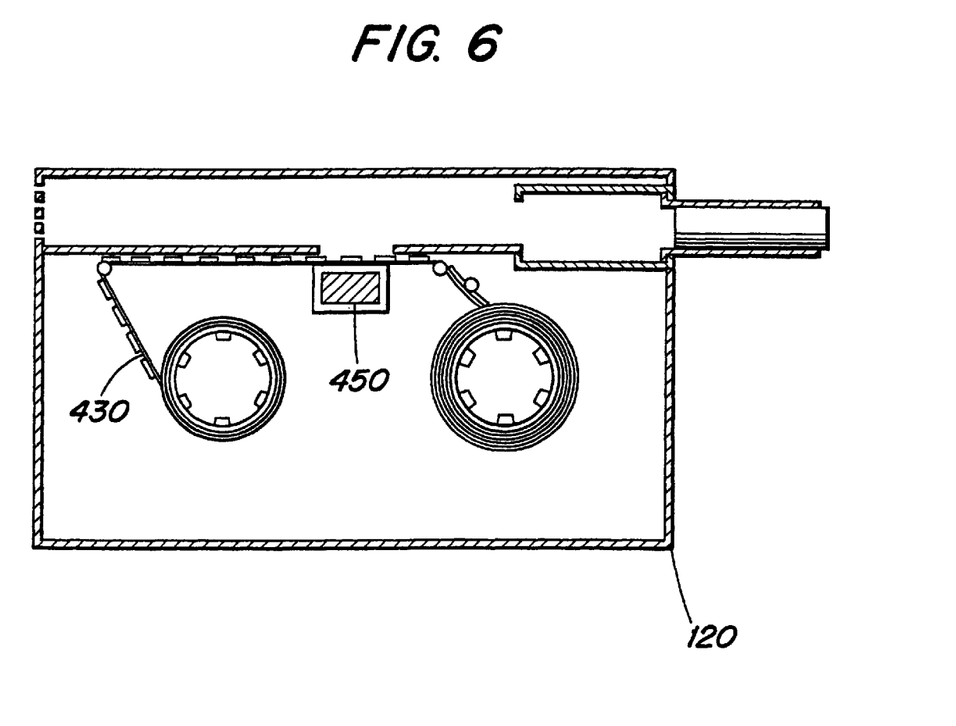
FIG. 6 shows an embodiment of the heat source of the present invention wherein the heat source is used in one type of portable, hand-held smoking device.

FIG. 6 illustrates the implemention of the heat source in one type of portable, hand-held smoking device. As shown in FIG. 6, the portable smoking device includes a cassette 120 which feeds a continuous web 430 containing tobacco past heat applying end 450 of the heat source. The heat source can be arranged to directly or indirectly heat the tobacco to a temperature suitable for smoking the tobacco inhaled by the smoker.

Figure 5:
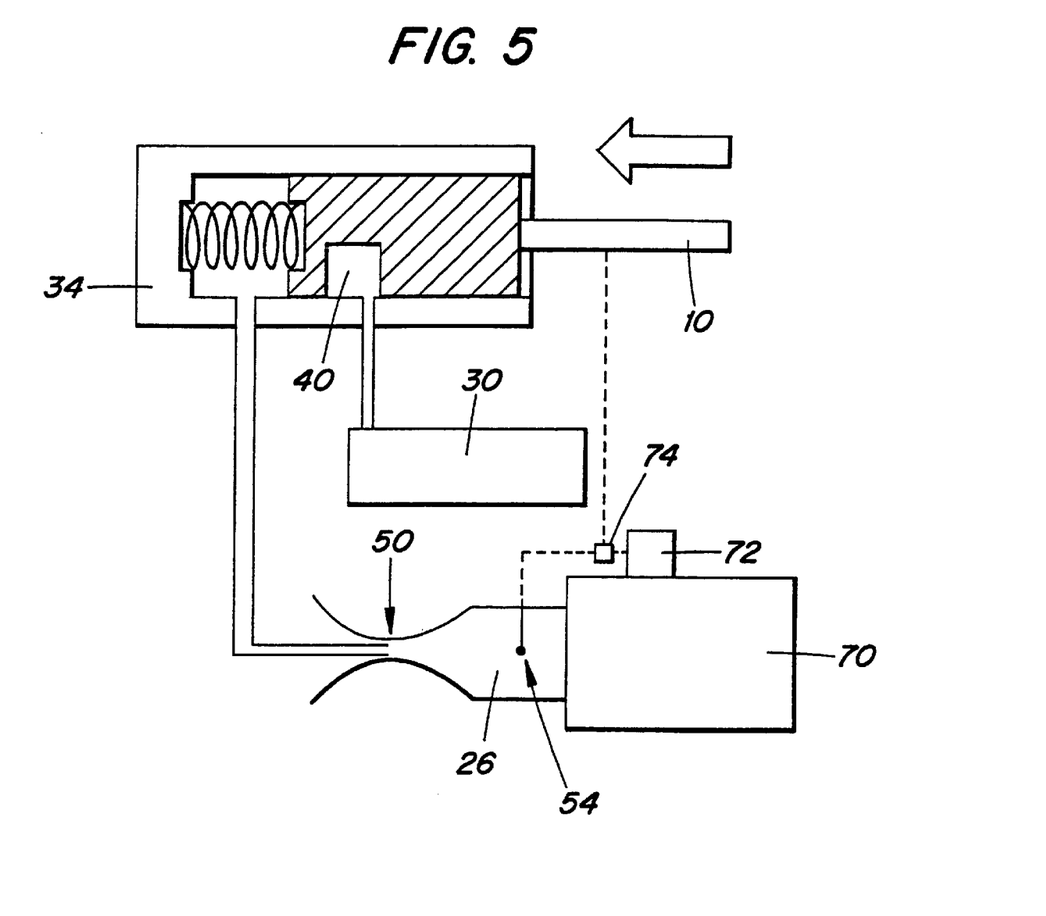
FIG. 5 is a schematic diagram of a further embodiment of the heat source of the present invention wherein the heat source is used to drive a microturbine.

In the embodiment shown in FIG. 5, the combusted mixture can be used to drive a microturbine 70 which generates electrical power. The electrical power generated by the microturbine can be stored in a suitable storage device such as a battery or capacitor 72 which can be used to power the igniter 54. For example, the trigger 10 can be connected to a switch 74 which allows the battery/capacitor to deliver current to the igniter when the combustible mixture is delivered to the combustion chamber 26. If desired, the heat generated by the fuel could be used solely for operating the microturbine 70 and the object to be heated could be heated by resistance heating from the electricity generated by the microturbine 70. Still yet, the output of the microturbine could be used for purposes other than heating an object, e.g., the microturbine 70 could be used for other types of devices which rely on electrical energy. For instance, such an electricity generating miniature heat source could be used to generate electricity for portable electrical equipment such as wireless phones, portable computers, electronic sensing devices, electronic monitoring equipment, lighting equipment, heating equipment, etc.

The miniature pulsed heat source can also be adapted for use as a micro-combustion device for a microturbine of an engine for use in a wide range of power, propulsion, and thermodynamic applications. For example, the heat source can be used as part of the microcomponentry of an arrangement wherein a microcombustion chamber feeds a microturbine, such as a micro-gas turbine engine 70 as also shown in FIG. 5 and described in U.S. Pat. No. 5,932,940, the disclosure of which is hereby incorporated by reference.

As indicated by the various applications for the pulsed heat source, it is contemplated that the heat source of the present invention could be implemented in any type of environment where a high energy pulse of heat is desired. Thus, while the invention has been described in detail with reference to preferred embodiments thereof, it will be apparent to one skilled in the art that various changes can be made, and equivalents employed, without departing from the scope of the invention.

What is claimed is:

1. A miniature heat source for providing a pulsed amount of heat comprising:
 a housing including a liquid fuel source, a combustion chamber and a valve member;
 the valve member being movable between a first position and a second position, said valve member having a metering chamber for holding a metered quantity of fuel, said metering chamber being in fluid communication with the liquid fuel source and out of fluid communication with the combustion chamber when said valve member is in said first position, and said metering chamber being out of fluid communication with said liquid fuel source and in fluid communication with the combustion chamber when said valve member is in said second position and said metered quantity of fuel is delivered to the combustion chamber to generate a pulsed amount of heat; and
 the combustion chamber generating a pulsed amount of heat by catalytic combustion of a combustible fuel mixture including the fuel supplied to the combustion chamber by the valve member.

2. The miniature heat source apparatus of claim 1, wherein the combustion chamber includes a catalyst material effective to cause catalytic combustion of the combustible fuel mixture.

3. The miniature heat source apparatus of claim 2, wherein the catalyst material is supported by a screen located in a flow path of the combustible fuel mixture.

4. The miniature heat source apparatus of claim 3, wherein the screen is preheated by a heater so that catalytic combustion is effected when the combustible fuel mixture is contacted by the screen.

5. The miniature heat source apparatus of claim 3, further comprising an object to be heated by the pulsed amount of heat, the object to be heated being located such that the pulsed amount of heat emerges through the screen prior to heating the object to be heated.

6. The miniature heat source apparatus of claim 5, wherein the screen is in direct contact with the object to be heated by the pulsed amount of heat.

7. The miniature heat source apparatus of claim 1, wherein the combustion chamber includes an igniter element which ignites the combustible fuel mixture.

8. The miniature heat source apparatus of claim 7, wherein the igniter element comprises a spark generator which produces a spark in the combustion chamber.

9. The miniature heat source apparatus of claim 8, wherein the spark generator is an electric spark generator.

10. The miniature heat source apparatus of claim 2, wherein the catalyst material comprises of one or more of platinum, palladium, rhodium and iridium.

11. The miniature heat source apparatus of claim 1, further comprising a heat transfer member which transfers the pulsed amount of heat to an object to be heated.

12. The miniature heat source apparatus of claim 11, wherein the heat transfer member includes a laminate including a substrate layer and a catalytic material.

13. The miniature heat source apparatus of claim 12, wherein the substrate layer is in direct thermal contact with the object to be heated.

14. The miniature heat source apparatus of claim 12, wherein the catalytic material includes one or more of platinum, palladium, rhodium and iridium.

15. The miniature heat source apparatus of claim 12, wherein the substrate layer comprises a metallic layer or a ceramic layer.

16. The miniature heat source apparatus of claim 11, wherein the heat transfer member comprises a porous substrate with at least one of platinum, palladium, rhodium and iridium particles contained therein.

17. The miniature heat source apparatus of claim 11, wherein the heat transfer member isolates a combustion byproducts gaseous stream from an airstream heated by the pulsed amount of heat.

18. The miniature heat source apparatus of claim 1, wherein the valve member is a sliding valve.

19. The miniature heat source apparatus of claim 1, wherein the combustion chamber includes a venturi eductor which includes an opening through which air mixes with the fuel to form the combustible fuel mixture.

20. The miniature heat source apparatus of claim 1, further comprising an electricity generating microturbine which is driven by combustion of the combustible fuel mixture.

21. The miniature heat source apparatus of claim 19, wherein the venturi eductor of the combustion chamber mixes the fuel in a gaseous form with the air.

22. The miniature heat source apparatus of claim 21, wherein the venturi eductor includes a converging cone section, a throat section and an expanded cone section, the air passing through the converging cone section into the throat section, the fuel being supplied in gaseous form to the throat section, and the gaseous fuel and air being formed into the combustible fuel mixture in the expanded cone section.

23. The miniature heat source apparatus of claim 22, wherein the converging cone section of the venturi eductor compresses the air.

24. The miniature heat source apparatus of claim 1, wherein the miniature heat source comprises a heater in a smoking device wherein a strip of tobacco is heated by the pulsed amount of heat.

25. The miniature heat source apparatus of claim 1, wherein the metered quantity of fuel delivered by the valve member is in the form of a gaseous fuel.

26. A hand-held tobacco smoking system including the miniature heat source apparatus of claim 1, wherein the pulsed amount of heat heats tobacco.

27. An electricity producing microturbine including the miniature heat source apparatus of claim 1, wherein the pulsed amount of heat drives the microturbine.

28. A method of smoking tobacco using the apparatus of claim 1, the method comprising producing a pulsed amount of heat with the miniature heat source and heating tobacco with the pulsed amount of heat.

29. A method of generating electricity using the apparatus of claim 1, comprising producing a pulsed amount of heat with the miniature heat source and driving a microturbine with the pulsed amount of heat to generate electricity.

30. The method of generating electricity of claim 29, further comprising the step of storing the generated electricity in a battery or a capacitor.

31. A method of producing power by operating a microturbine of a micro-gas turbine engine using the apparatus of claim 1, comprising producing a pulsed amount of heat with the miniature heat source apparatus and driving the microturbine with the pulsed amount of heat to generate power.

* * * * *